US011163370B2

(12) United States Patent
Parland

(10) Patent No.: US 11,163,370 B2
(45) Date of Patent: Nov. 2, 2021

(54) SYSTEM AND METHOD FOR CAPTURING PRESENTATION GESTURES

(71) Applicant: RingCentral, Inc., Belmont, CA (US)

(72) Inventor: Erik Dmitrievich Parland, Burnaby (CA)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/656,142

(22) Filed: Oct. 17, 2019

(65) Prior Publication Data

US 2020/0393909 A1 Dec. 17, 2020

(51) Int. Cl.
*G06F 3/01* (2006.01)
*H04N 5/265* (2006.01)
*G06T 11/20* (2006.01)
*G06K 9/00* (2006.01)
*H04N 7/15* (2006.01)

(52) U.S. Cl.
CPC ......... *G06F 3/017* (2013.01); *G06K 9/00355* (2013.01); *G06T 11/203* (2013.01); *H04N 5/265* (2013.01); *H04N 7/15* (2013.01)

(58) Field of Classification Search
CPC ........... G06F 3/017; G06F 2203/04101; G06F 3/0425; H04N 5/265; H04N 7/15; H04N 7/147; G06K 9/00355; G06K 9/00335; G06T 11/203
See application file for complete search history.

(56) References Cited

U.S. PATENT DOCUMENTS

| | | | | |
|---|---|---|---|---|
| 2010/0306712 A1* | 12/2010 | Snook | ................ | G06K 9/00342 715/863 |
| 2011/0154266 A1* | 6/2011 | Friend | ...................... | G09B 5/06 715/863 |
| 2011/0185300 A1* | 7/2011 | Hinckley | ............ | G06F 3/03545 715/769 |
| 2012/0268364 A1* | 10/2012 | Minnen | ................. | G06F 3/0304 345/156 |
| 2013/0278501 A1* | 10/2013 | Bulzacki | ............... | G06F 3/0304 345/157 |
| 2014/0347263 A1* | 11/2014 | Dai | ......................... | G06F 3/017 345/156 |
| 2015/0153836 A1* | 6/2015 | Liu | ......................... | G06F 3/017 345/156 |
| 2016/0154469 A1* | 6/2016 | Zhao | ................... | G06K 9/00355 345/158 |
| 2017/0026617 A1* | 1/2017 | Wang | .................. | H04N 21/4524 |
| 2017/0228135 A1* | 8/2017 | Vendrow | ............... | H04L 65/403 |

FOREIGN PATENT DOCUMENTS

EP 3651055 A1 * 5/2020 ............. G06N 20/10

* cited by examiner

*Primary Examiner* — Michael Le

(57) ABSTRACT

A computer-implemented method and system for, using a camera, detecting a gesture during a video stream; using a computing device, generating a digital drawing that corresponds to the gesture and storing the digital drawing in a database as a gesture layer; using the computing device, combining the gesture layer with the video stream to generate a gesture visualization; and using the computing device, causing the gesture visualization to be displayed in one or more displays of one or more other computing devices.

17 Claims, 9 Drawing Sheets

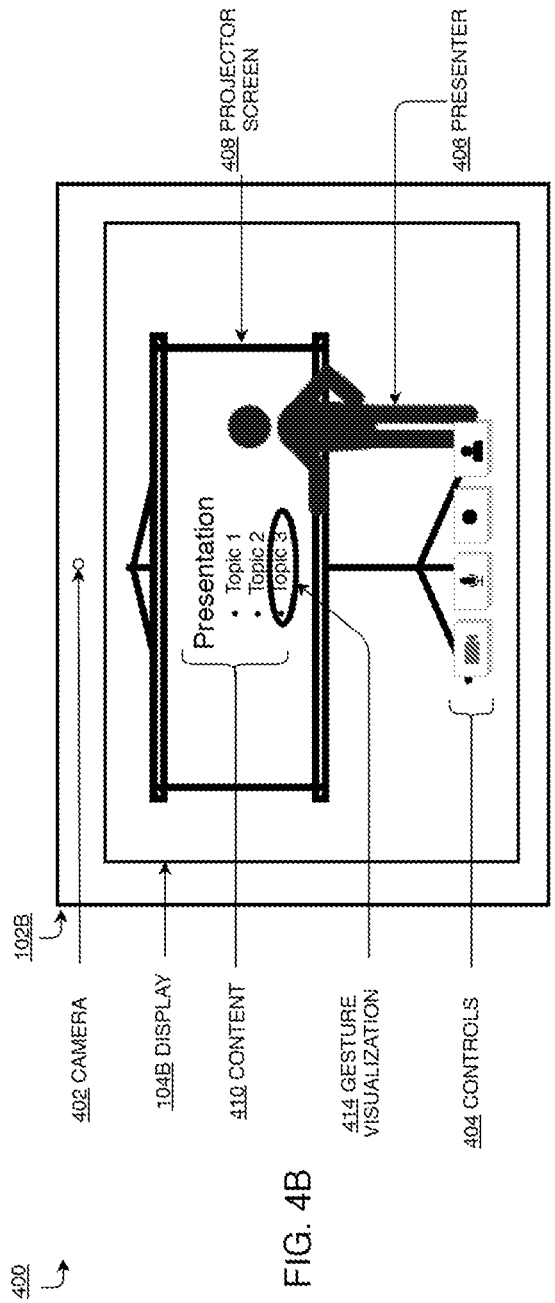

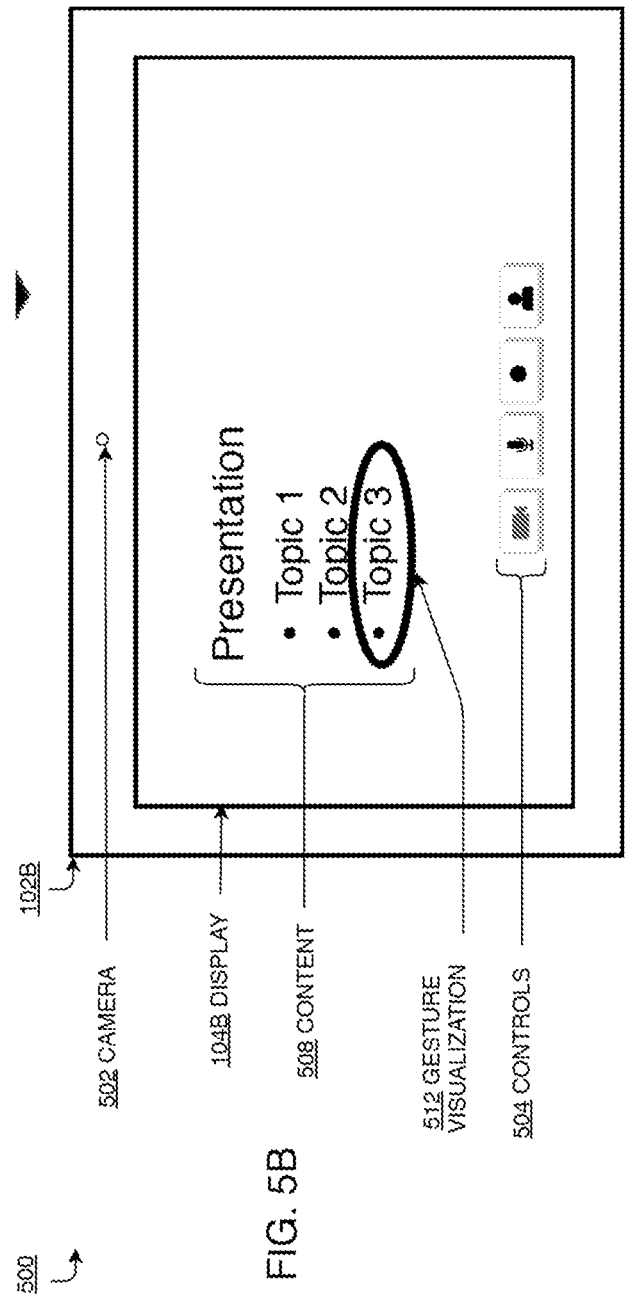

SYSTEM AND METHOD FOR CAPTURING PRESENTATION GESTURES

RELATED APPLICATION

This application is a continuation application of and claims the benefit and priority to the International application number PCT/RU2019/000422 filed on Jun. 14, 2019, which is incorporated herein by reference in its entirety.

TECHNICAL FIELD

The present disclosure relates generally to the field of video conferencing. Specifically, the present disclosure relates to systems and methods for capturing presentation gestures through a video conferencing application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Streaming and recording presentations or meetings using a video conferencing application has become more prominent in recent years. A presenter often gestures towards a presentation screen or a video shared screen to emphasize certain points, draw associations, clarify content, and so forth. For instance, a person sharing his or her screen to present a slide often points to, underlines, or circles a particular word, graph or image in the slide presentation to emphasize its importance. Viewers often find it difficult to follow or memorize what a presenter gestures towards, and a presenter finds it difficult to include spontaneous edits or clarifications while conducting the presentation.

Therefore, there is a need for digitally capturing and visualizing physical gestures in association with video conferencing session automatically.

SUMMARY

The appended claims serve as a summary of the invention.

The disclosed example embodiments relate to systems and methods for improving digital capturing of gestures. The method comprises using a camera to detect a gesture during a video stream. Using a computing device, a digital drawing that corresponds to the gesture is generated and stored in a database as a gesture layer. Using the computing device, the gesture layer and the video stream are combined to generate a gesture visualization. Using the computing device, the gesture visualization is displayed in one or more displays of one or more other computing devices.

In some embodiments, detecting the gesture comprises detecting a gesture trigger using a trained machine learning model. In some embodiments, the system and method further comprise detecting a gesture completion using a trained machine learning model. In some embodiments, generating a digital drawing is response to detecting a gesture completion.

In an embodiment, the system and method further comprise generating a first grid for a first frame of the video stream featuring the gesture, and generating a first mark on the first grid, wherein the first mark represents a first placement of the gesture for the first frame. The system and method further comprise generating a second grid for a second frame of the video stream featuring the gesture, and generating a second mark on the second grid, wherein the second mark represents a second placement of the gesture for the second frame. In an embodiment, generating the digital drawing comprises connecting the first mark to the second mark.

In some embodiments, the system and method comprise, using the computing device, causing the gesture visualization to be displayed in a display associated with the computing device. In some embodiments, the gesture comprises movement from a human or an instrument. In an embodiment, this gesture visualization feature is applied by default to all video streaming such that gestures are automatically recognized regardless of the content of the video conferencing session. In an embodiment, the gesture visualization feature may be activated or deactivated using a control in a graphical user interface (GUI) in accordance with a user's preferences.

BRIEF DESCRIPTION OF THE DRAWINGS

FIG. 4A and FIG. 4B are diagrams that illustrate gesture capturing, in an example embodiment.

FIG. 5A and FIG. 5B are diagrams that illustrate gesture capturing, in an example embodiment.

DETAILED DESCRIPTION

Figure 1:
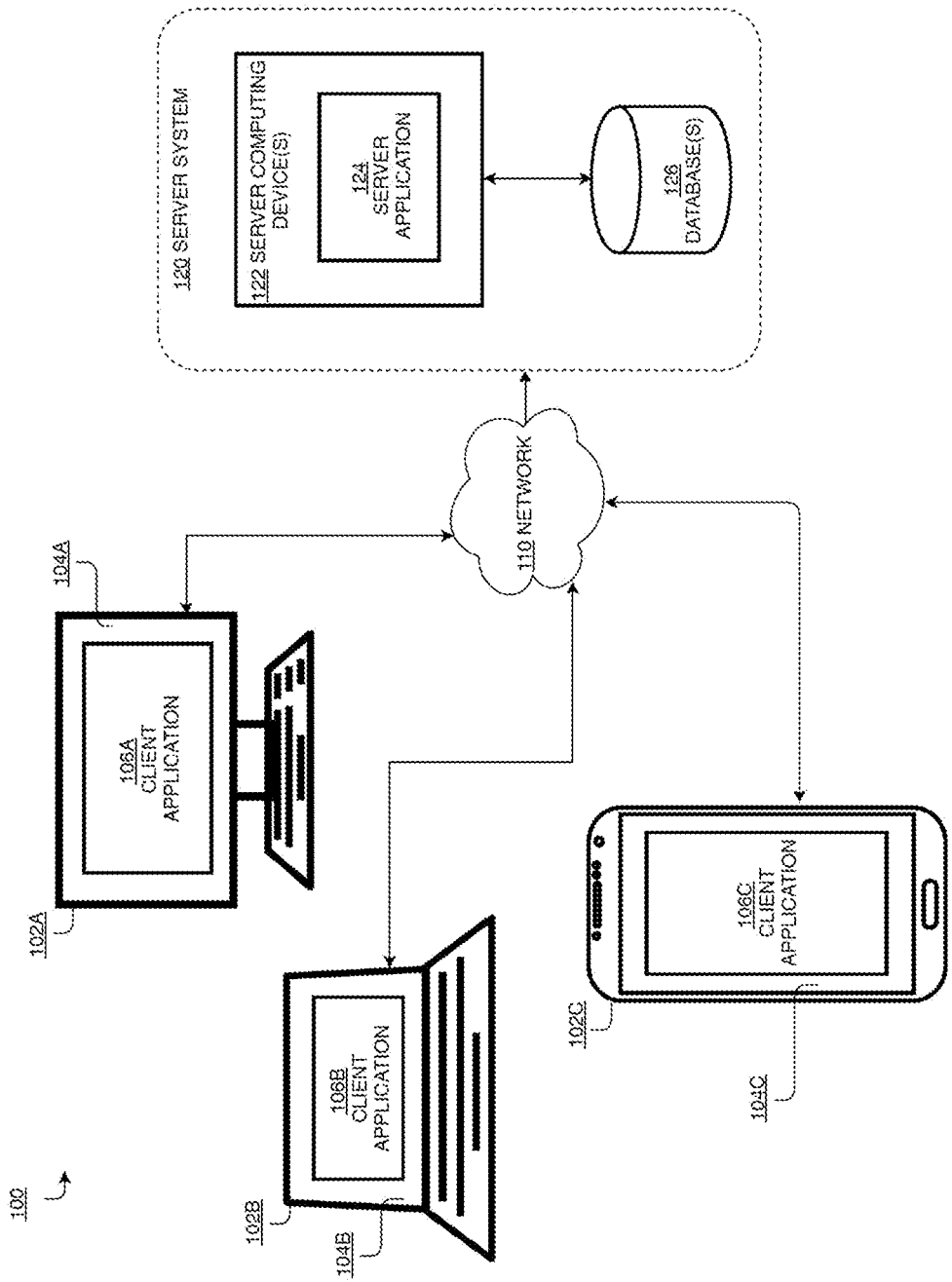
FIG. 1 is a network diagram that illustrates a networked computer system, in an example embodiment.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form to avoid unnecessarily obscuring the present disclosure.

Embodiments are described in sections according to the following outline:
 1.0 GENERAL OVERVIEW
 2.0 STRUCTURAL OVERVIEW
 3.0 FUNCTIONAL OVERVIEW
 3.1 Gesture Detection Module
 3.2 Gesture Capture Module
 3.3 Gesture Interpretation Module
  3.3.1 Interpreting Gesture Type
  3.3.2 Interpreting Gesture Placement
  3.3.3 Interpreting Gesture Content
  3.3.4 Interpreting Gesture Originator
 3.4 Drawing Module
 3.5 Stitching Module
 3.6 Display Module
 3.7 Example Embodiments
 4.0 PROCEDURAL OVERVIEW

1.0 General Overview

Video conferencing applications are often used to live stream presentations and visually share materials using screen sharing features. When a presenter makes a gesture towards a presentation that has been projected onto a display such as a projector screen or a large display monitor, there is no way to digitally capture that gesture in association with the projected presentation automatically. For example, if a presenter circles a particular bullet point with his or her hands, the gesture is not captured or visualized by the video conferencing system. Similarly, when a meeting attendee shares his or her screen with other attendees, there is no way of digitally capturing any gestures that the sharer makes towards the shared screen automatically without using a mouse, stylus, and/or a touch screen. Therefore, there is a need for digitally capturing gestures in association with a presentation screen or shared screen automatically.

The current disclosure provides a technological solution to the technological problem of digitally capturing and visualizing gestures that would otherwise not be captured or visualized. The technological solution involves using a camera and a video conferencing system to detect the presence of a gesture, capture the gesture as a drawing, stitch the drawing to the original video stream, and display the gesture visualization to one or more participants of the video conferencing session. Traditionally, video conferencing sessions are incapable of capturing gestures without using, for example, a mouse, stylus, and/or touchscreen to generate a drawing or visualization. However, the current solution automatically detects a gesture that is made independently of any mouse, stylus, or touchscreen input by using video capture alone. In other embodiments, the current solution also automatically detects gestures made with a stylus, pointer laser, or any other tool. Therefore, the current solution provides the technological benefit of generating a digital representation of a gesture using video where there previously was none.

Moreover, without a visualization of gestures in association with a shared screen, for example, audience members are often confused as to which portions a presenter is gesturing towards. Similarly, presenters are often confused as to which portions of their shared screen an audience member is gesturing towards, especially when the audience member has no control over the shared screen that the presenter is sharing. Therefore, the current solution also provides the technological benefit of decreasing wasteful use of excess processing power that would otherwise be spent trying to abate presenter and/or audience confusion. The current solution also provides the technological benefit of memorializing gestures in association with shared content.

While the foregoing examples provide specific details, the examples are not intended to be limiting.

2.0 Structural Overview

FIG. 1 illustrates a networked computer system 100, in an example embodiment. In the embodiment of FIG. 1, the networked computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

In the example FIG. 1, a networked computer system 100 facilitates the exchange of data between programmed computing devices. In an embodiment, the networked computer system 100 may be a system of computing devices configured to send, receive, and process digital presentation data and automatically generate a recommendation based on an anticipated audience. Therefore, each of elements 102A, 102B, 102C, 120, and 122, of FIG. 1 represents one or more computers that are configured to provide the functions and operations that are described further herein in connection with network communication. FIG. 1 illustrates only one of many possible arrangements of components configured to execute the programming described herein. Other arrangements may include fewer or different components, and the division of work between the components may vary depending on the arrangement. For example, while three client computing devices 102A, 102B, 102C are depicted in FIG. 1, communication can occur between or among any number of client devices.

Various example embodiments of the networked computer system 100 may include computer-implemented methods, tangible non-transitory computer-readable mediums, and systems. The computer-implemented methods may be executed, for example, by at least one processor that receives instructions from a non-transitory computer-readable storage medium. Similarly, systems and devices consistent with the present disclosure may include at least one processor and memory, and the memory may be a non-transitory computer-readable storage medium. As used herein, a non-transitory computer-readable storage medium refers to any type of physical memory on which information or data readable by at least one processor can be stored. Examples may include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories or computer-readable storage mediums. As referred to herein, a "memory" may include any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Client computing device(s) 102A, 102B, 102C, are general or specialized computing devices, such as desktop computers, laptop computers, mobile smartphones, tablets, smartwatches, smart glasses, virtual reality headsets, IoT devices, televisions, display screens, and so forth. Client computing device(s) 102A, 102B, 102C each feature a camera or are operatively connected to cameras. The client computing devices 102A, 102B, 102C are configured to send and receive digital media data, such as live video streams. The client computing device(s) 102A, 102B, 102C each feature a display 104A, 104B, 104C for displaying digital content, such as video. In an example embodiment, client computing devices 102A, 102B, 102C run a client application 106A, 106B, 106C, which facilitates digital streaming of media data and sends the media data to server computing device 122. Media data is, for example, all data associated with real-time video streaming data captured by an associated camera. Media data also includes digital layers corresponding to gesture capture and/or visualization, in an example embodiment. In an embodiment, client application 106A, 106B, 106C is configured to activate an associated camera and send the video stream to the server application 124. The server application 124 subsequently detects and captures gestures as drawings and combines them with the original livestream for redistribution and displaying on other devices in some embodiments, as further described herein. Any combination of devices and applications may be implemented.

Network 110 broadly represents a combination of one or more local area networks (LANs), wide area networks (WANs), metropolitan area networks (MANs), global interconnected internetworks, such as the public internet, public switched telephone networks ("PSTN"), or a combination thereof. Each such network 110 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 110 and the disclosure presumes that all elements of FIG. 1 are communicatively coupled via network 110.

Server system 120 has one or more server computing device(s) 122 and one or more database(s) 126. Server computing device 122 is one or more general or specific server computing devices or server processes. In an example embodiment, server computing device 122 is implemented as one or more application servers that are programmed or configured to execute a server application 124. Server application 124 is software that facilitates gesture detection and visualization through a series of software application instructions or modules. In some example embodiments, server application 124 is a media processing application for processing live video streams. In an embodiment, server application 124 includes embedded Application Programming Interface (API) calls from any number of partner applications.

Server computing device 122 is operatively connected to database 126. The database 126 represents one or more local or remote databases that store media data, such as a video streaming data, as well as gesture data, such as machine learning algorithms and training datasets for gesture detection, and digital drawings of a gesture stored as a gesture layers, or any other gesture data. In some embodiments, database 126 is configured as two separate databases for storing video data and gesture data. In other embodiments, database 126 is configured as three separate databases for storing video data, gesture detection training data, and gesture visualization data. While the foregoing presents specific examples of the number of databases, the examples are not intended to be limiting. Therefore, database 126 may be configured as any number of separate databases for storing any type of data.

3.0 Functional Overview

Figure 2A:
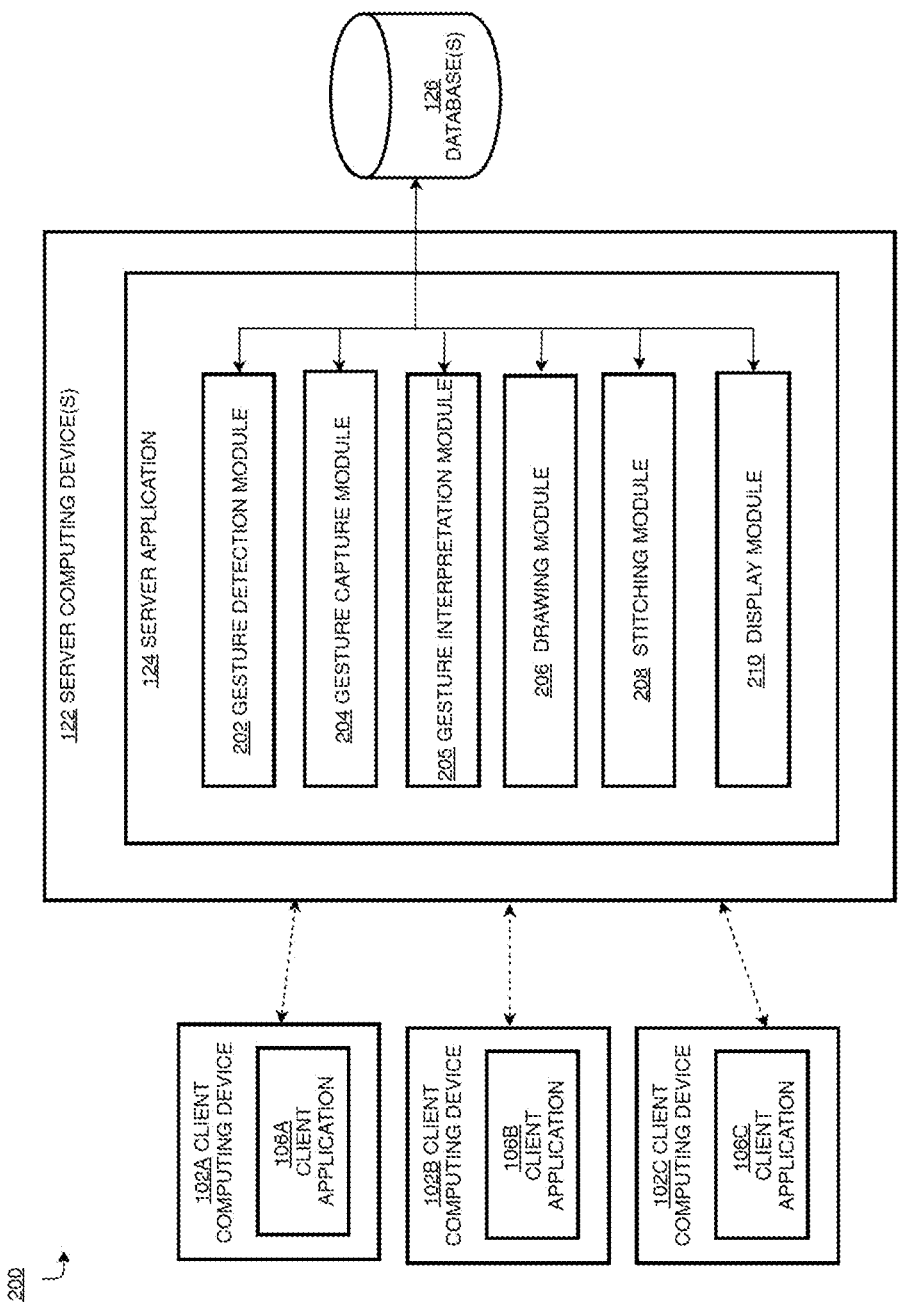
FIG. 2A is a block diagram that shows a gesture visualization system, in an example embodiment.

FIG. 2A illustrates a gesture visualization system 200, in an example embodiment. As depicted in FIG. 1, the gesture visualization system 200 comprises one or more server computing devices 122 that executes server application 124. In the example embodiment of FIG. 2, one server computing device 122 is depicted. However, in some embodiments, multiple server computing devices are used. Moreover, in the example embodiment of FIG. 2A, one server application 124 is depicted. However, in some embodiments, multiple applications are used. Any number of server computing devices and any number of applications, in any combination, may be used.

The server application 124 is configured with one or more sets of instructions or modules. In the example of FIG. 2A, the server application 124 is configured with a gesture detection module 202, a gesture capture module 204, a gesture interpretation module 205, a drawing module 206, a stitching module 208, and a display module 210. While the example of FIG. 2A depicts a specific number of modules, more modules or fewer modules may be used in other embodiments.

Figure 2B:
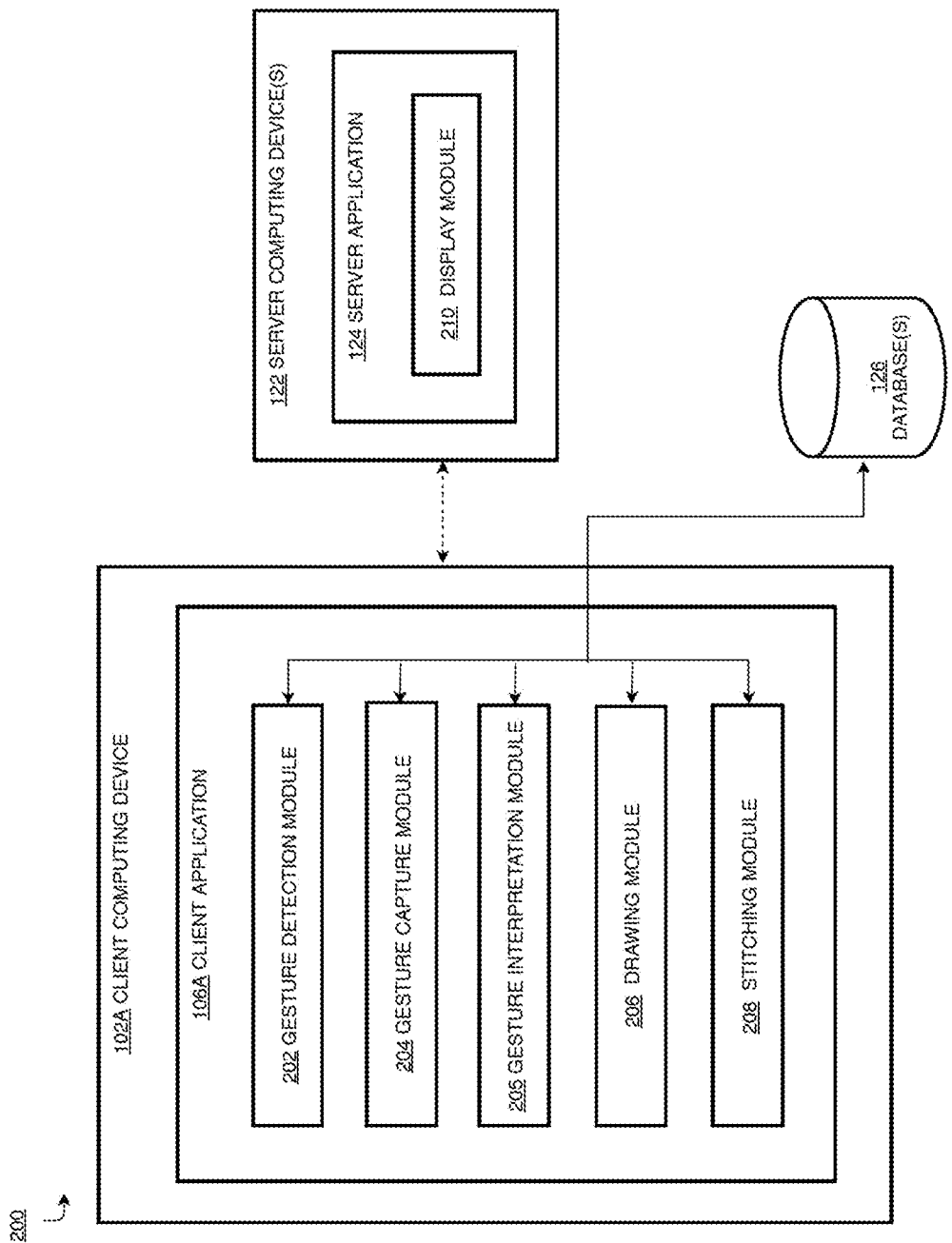
FIG. 2B is a block diagram that shows a gesture visualization, in an example embodiment.

While the example of FIG. 2A depicts a server application 124 executing the modules, the modules are not limited to server application 124. For example, FIG. 2B illustrates a gesture visualization system 200, in another embodiment. In the embodiment of FIG. 2B, client application 106A is configured with the gesture detection module 202, gesture capture module 204, gesture interpretation module 205, drawing module 206, and stitching module 208 for client-side processing rather than server-side processing. In such an embodiment, client applications 106A, 106B, 106C are responsible for detecting, interpreting, and visualizing gestures and sending the video stream to the server computing device 122 for subsequent redistribution. For example, the client application 106A is configured to detect, interpret, and capture gestures as drawings, combine them with the original livestream, and send the gesture visualization to the server computing device 122. The server application 124 is configured with a display module 210, which redistributes and causes the displaying of the gesture visualization in one or more displays 104A, 104B, 104C of the client computing devices 102A, 102B, 102C. While the example of FIG. 2B depicts a single client computing device 102A and a single client application 106A, any number of client computing devices 102A, 102B, 102B and any number of client applications 106A, 106B, 106C may execute the modules.

For illustration purposes, in the examples of FIG. 2A and FIG. 2B, all modules are executed by one server computing device 122 or one client computing device 102A, respectively. In another embodiment, the instructions are executed by multiple server computing devices 122 or multiple client computing devices 102A, 102B, 102C. For example, one server computing device 122 can execute a select number of modules, such as the gesture detection module 202 and the gesture capture modules 204, while another server computing device 122 executes the drawing modules 206, the stitching module 208, and the display modules 210. In another embodiment, each module may be executed by a dedicated server computing device 122. For example, the gesture detection module 202 is executed by a first server computing device, the gesture capture module 204 is executed by a second server computing device, the drawing module 206 is executed by a third server computing device, the stitching module 208 is executed by a fourth server computing device, and the display module 210 is executed by a fifth server computing device. Any number of server computing devices 122 can be used to execute any number of modules. In some embodiments, each of the modules described herein are capable of accessing information that is stored in database 126. Database 126 is one or more structured or non-structured data repositories.

In some embodiments, the gesture detection module 202, gesture capture module 204, gesture interpretation module 205, drawing module 206, stitching modules 208, and/or display module 210 are configured to generate and display a gesture visualization, as further described herein.

3.1 Gesture Detection Module

The gesture detection module 202 of FIG. 2A and FIG. 2B is configured to detect when a gesture is being made. In an embodiment, a gesture is any movement made by a human or non-human component. For example, a gesture may be a hand circling portions of content displayed on a projector screen, a laser beam pointing to portions of content displayed on a projector screen, a finger underlining portions of content displayed through a digital computer display, a finger drawing an asterisk next to content displayed through a digital television display, or any other gesture. In an embodiment, a presentation is any content that is presented, whether physical or digital. Digital content includes files, documents, images, presentations, or any other type of digital content. Physical content includes any physical object. For example, an animal dissection that is streamed for educational purposes features the physical animal as the presentation content and a presenter who points to certain portions of the animal's anatomy.

In an embodiment, the gesture detection module 202 is non-discriminant as to the individual making the gesture. In some embodiments, there may be multiple presenters who gesture towards a presentation. In other embodiments, audience members or other participants may gesture towards the presentation. The gesture detection module 202 is configured to detect any gesture from any individual or instrument as long as a gesture trigger is present, as further described herein.

Presenters often make gestures without intending to reference a presentation. For example, a presenter may scratch his or her face, lift up a cup to take a drink, or make general, non-specific gestures while walking in front of a projector screen. The gesture detection module 202 monitors media data from a camera that is associated with a client computing device 102A, 102B, 102C, and distinguishes between gestures that should be captured for subsequent visualization and those that should not be captured for subsequent visualization.

In some embodiments, one or more triggers are used to identify gestures for capturing. For example, the gesture detection module 202 may be configured to identify a finger or hand pointed towards a presentation screen, a finger drawing a certain shape in the air, or any other gestures as a specific trigger for subsequent gesture visualization. In some embodiments, the gesture detection module 202 is configured to identify only a limited type of gesture as a trigger, such as a specialized hand signal. For example, the server-side application 124 or client-side application 102A, 102B, 102C may be configured to identify when a presenter taps an index finger and thumb together, draws a "V" in the air using a finger to trigger subsequent gesture visualization, or makes any other specialized signal. The specialized signal is used as a trigger for subsequent gesture capture and visualization.

Figure 3:
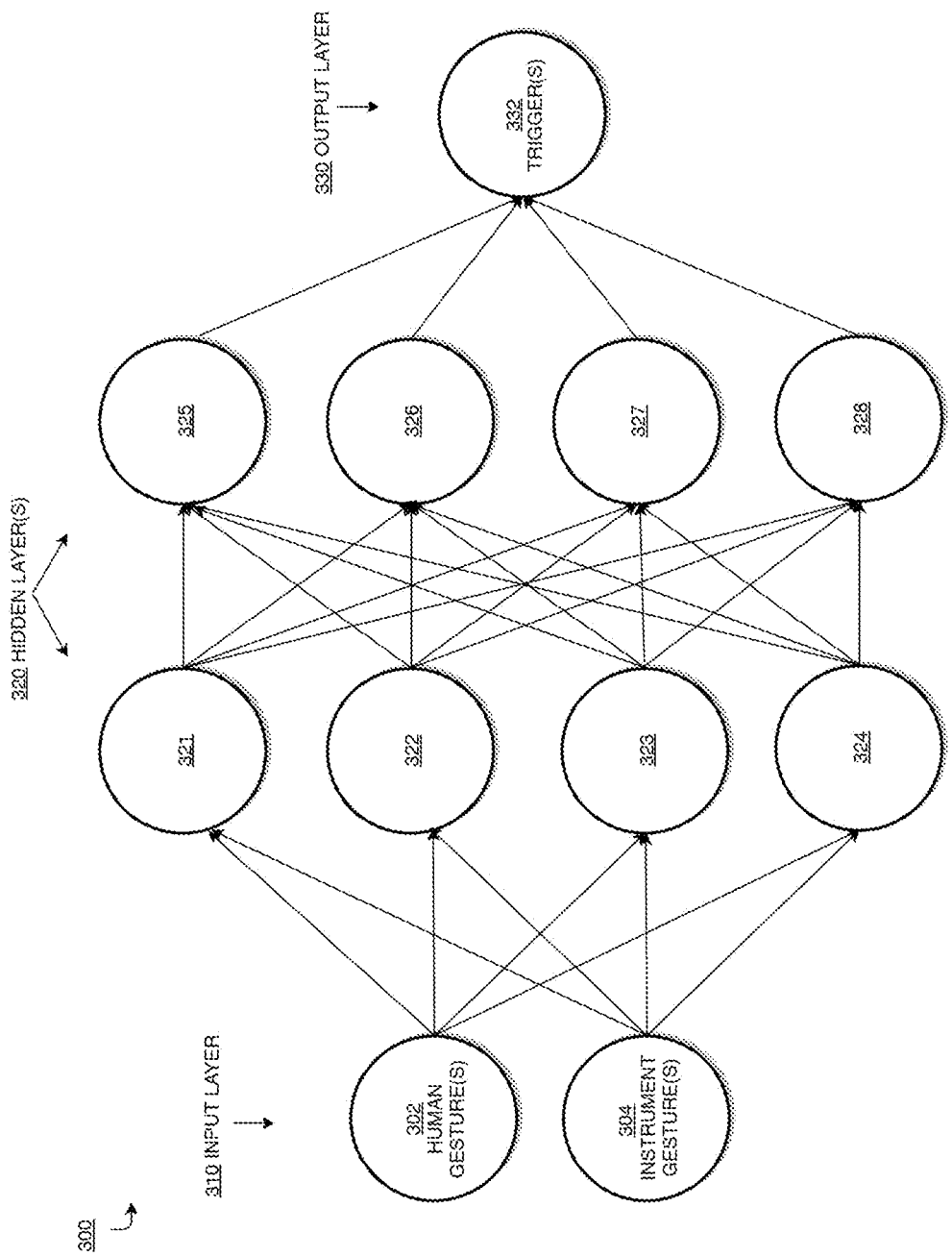
FIG. 3 is a block diagram that depicts a neural network, in an example embodiment.

In an embodiment, machine learning may be used to train the gesture detection module 202 into recognizing triggers. Referring to FIG. 3, a neural network 300 may utilize an input layer 310, one or more hidden layers 320, and an output layer 330 to train a machine learning algorithm or model to detect a trigger, such as a pointed finger towards a projector screen. In some embodiments, where trigger gestures are labeled, supervised learning is used such that known input data, a weighted matrix, and know output data is used to gradually adjust the model to accurately compute the already known output. In other embodiments, where trigger gestures are not labeled, unstructured learning is used such that a model attempts to reconstruct known input data over time in order to learn.

Training of the neural network 300 using one or more training input matrices, a weight matrix and one or more known outputs is initiated by one or more computers associated with the gesture detection module 202. For example, the gesture detection module 202 may be trained by one or more training computers and, once trained, used in association with the server computing device 122 and/or client computing devices 102A, 102B, 102C to detect triggers. In an embodiment, a computing device may run known input data through a deep neural network 300 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computing device then re-computes another output from the deep neural network with the input training matrix and the adjusted weight matrix. This process continues until the computer output matches the corresponding known output. The server computing device then repeats this process for each training input dataset until a fully trained model is generated.

In the example of FIG. 3, the input layer 310 includes a plurality of training datasets that are stored as a plurality of training input matrices in an associated database, such as database 126 of FIG. 2. The training input data includes, for example, data on human gestures 302 and data on instrument gestures 304. Human gesture 302 data is input data related to any human gestures, including facial gestures like winks, finger gestures, hand gestures, arm gestures, leg gestures, feet gestures, and so forth. Instrument gesture 304 data is input data related to any gestures made by instruments, including physical pointers, laser pointers, rulers, markers, pens, stylus pens, and so forth. While the example of FIG. 3 uses a single neural network for both human gesture and instrument gestures, in some embodiments, one neural network 300 would be used to train the gesture detection module 202 on human gestures while another neural network 300 would be used to train the gesture detection module 202 on instrument gestures. Any number of neural networks may be used to train the gesture detection module 202.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of hidden layers may be used for a standard or deep neural network. The example of FIG. 3 also features an output layer 330 with trigger(s) 332 as the known output. The trigger(s) 332 indicate one or more gestures that should be captured for subsequent visualization. For example, the trigger(s) 332 may be a finger pointed towards a projector screen or any other trigger. As discussed above, in this structured model, the triggers 332 are used as a target output for continuously adjusting the weighted relationships of the model. When the model successfully outputs the triggers 332, then the model has been trained and may be used to process live or field data.

Once the neural network 300 of FIG. 3 is trained, the trained gesture detection module 202 will accept field data at the input layer 310, such as current human gestures or current instrument gestures. In some embodiments, the field data is live data that is accumulated in real time, such as a live streaming video of a presenter making gestures. In other embodiments, the field data may be current data that has been saved in an associated database, such as database 126. The trained gesture detection module 202 is applied to the field data in order to identify one or more triggers at the output layer 330. For instance, a trained gesture detection module 202 can identify a person pointing at a projection screen as a trigger.

In some embodiments, the gesture detection module 202 is configured to calculate a distance between a finger or hand and a presentation relative to the camera capturing the image in order to determine a gesture trigger. For example, the gesture detection module 202 will monitor live streaming video for a hand or finger and determine an estimated distance between the camera and the hand or finger. It will also determine an estimated distance between the camera and the presentation. The gesture detection module 202 will then monitor the hand's distance away from the camera. If the hand or finger's distance approaches the presentation's distance, then a trigger will be met. For example, if a projector screen is located six feet away from a camera and a presenter's hand is located five feet away from the camera, when a presenter moves his or her hand closer to the projector screen, the location of the presenter's hand moves closer to the projector screen. When the presenter's hand is approximately six feet away from the camera and at the location of the projector screen, then the trigger will be met. In an embodiment, a threshold range is used. For example, if a hand or finger's distance approaches within a threshold range of five inches, three inches, two inches, or any other distance from the estimated distance of the presentation, then a trigger will be met. In an example embodiment where a presenter uses a screenshare function through the video conferencing application, the gesture detection module 202 will calculate an estimated distance between the camera and the presenter's shared screen. The gesture detection module 202 will also calculate an estimated distance between the camera and the presenter's hand or finger. If the hand or finger's distance approaches within a threshold range of two inches from shared screen, for example, then the gesture detection module 202 will recognize that a trigger has been met.

In some embodiments, the gesture detection module 202 uses image processing libraries and statistical analyses to detect a trigger. For instance, the gesture detection module 202 may be configured with a color-based filter that generates a binary black-and-white image of each frame. For example, if a camera captures the gesture of a finger, or any other human or non-human component, then each frame featuring the finger's gesture is sent to a filter. Subsequently, the filter generates an image of a white finger on a black background. While black and white are used in this particular example, the colors are not intended to be limiting and any color may be used. For example, in other embodiments, the generated image is of a black finger on a white background.

In an embodiment, the binary image is processed by an analyzer associated with the gesture detection module 202. The analyzer calculates vertices that are associated with the finger. The top vertex is entered into an array. When the array reaches a size of ten elements, for example, then the array is sent to a probabilistic analyzer associated with the gesture detection module. The probabilistic analyzer analyses the sequence of pairs of numbers using a least squares method of regression analysis to identify triggers.

In some embodiments, once the gesture detection module 202 recognizes a trigger during a video session, the gesture detection module 202 is activated such that it will continuously monitor for and detect triggers for the remainder of the video session. In other embodiments, the gesture detection module 202 is configured to identify when a gesture has been completed and signal the gesture capture module 204 to stop recording in response to detecting the completion of a gesture. In the latter embodiments, machine learning may be used to train the gesture detection module 202 in recognizing gesture completion. For example, a neural network may be used to train a machine learning algorithm or model to detect a gesture completion, such as moving a finger or hand away from a projection screen, turning off a laser pointer, or the completion of any other gesture.

Any of the machine learning techniques previously discussed may be used to detect gesture completion. For example, an input layer includes a plurality of training datasets that are stored as a plurality of training input matrices in an associated database, such as database 126. The training input data includes, for example, data on human gesture completion and data on instrument gesture completion. Human gesture completion data is input data related to the completion of any human gestures, including facial gestures like the completion of winks, the completion of finger gestures, the completion of hand gestures, the completion of arm gestures, the completion of leg gestures, the completion of feet gestures, and so forth. Instrument gesture completion data is input data related to the completion of any gestures made by instruments, including physical pointers, laser pointers, rulers, markers, pens, stylus pens, and so forth. In some embodiments, a single neural network is used for both human gesture completions and instrument gesture completions. In other embodiments, two or more neural networks are used.

In an embodiment, image processing libraries and statistical analysis may also be used to detect gesture completion. In the black-and-white trigger detection example above, the probabilistic analyzer may also be used to analyze sequences of pairs of numbers using a least squares method of regression analysis to identify gesture completions.

Once the gesture detection module 202 detects a trigger, the gesture detection module 202 initiates the gesture capture module 204, as further described herein.

3.2 Gesture Capture Module

The gesture capture module 204 of FIG. 2A and FIG. 2B is configured to record a gesture and store the recorded gesture in database 126 for further gesture visualization processing. For example, in some embodiments, once the gesture detection module 202 detects a trigger, the gesture detection module 202 activates the gesture capture module 204. The gesture capture module 204 subsequently uses a recording function associated with the client application 106A, 106B, 106C to record media data, such as a live streaming video, in order to capture one or more gestures and store them in database 126 for further processing by the drawing module 206. In some embodiments, database 126 is cache database.

In an embodiment, the gesture capture module 204 captures the gesture in association with a timestamp and/or a date. The timestamp may be based on a conference session recording time where t=00:00:00 is time at the start of the conferencing session when zero hours, zero minutes, and zero seconds has passed, in an example embodiment. The date may be the month, day, and year of the conferencing session based on a system clock of a computing device. In some embodiments, the timestamp is a system time and/or date based on the system clock of the client computing device 102A, 102B, 102C or the server computing device 122. In an embodiment, the gestures and associated timestamps and/or dates captured by the gesture capture module 204 are used to generate a log of various types of gestures as part of a gesture library for subsequent use in statistical analyses and/or as machine learning training data, for example. The timestamp data, date data, and/or log data may be stored in database 126. The date and timestamps may also be used in subsequent processing by the gesture interpretation module 205, drawing module 206, stitching module 208, or any other module, as further described herein.

3.3 Gesture Interpretation Module

In some embodiments, the gesture visualization system 200 includes a gesture interpretation module 205. In an embodiment, the gesture interpretation module 205 of FIG. 2A and FIG. 2B is configured to compare the detected gesture with known gestures that are stored in a gesture library in database 126. If the detected gesture matches a known or approved gesture in the gesture library, then the gesture interpretation module 205 initiates the drawing module 206, as further described herein. In some embodiments, all gestures stored in the gesture library are considered approved or appropriate for subsequent drawing and visualization, while gestures not stored in the gesture library will not be drawn or visualized. In another embodiment, the gesture interpretation module 205 is configured to determine a placement or location of a subsequent drawing. In another embodiment, the gesture interpretation module 206 is configured to determine the displayed content that a subsequent drawing refers to. In yet another embodiment, the gesture interpretation module 206 is configured to determine and distinguish between gesture originators.

3.3.1 Interpreting Gesture Type

In some embodiments, the gesture interpretation module 205 receives the recorded gesture from the gesture capture module 204 and compares the recorded gesture with gestures in a gesture library for a match. In some embodiments, the gesture interpretation module 205 conducts statistical analyses of various types of gestures to determine base gestures for the gesture library and subsequently match recorded gestures with the base gestures. For example, a series of sample recorded gestures for each type of gesture is averaged to determine a standard base gesture for storage in the gesture library.

In an embodiment, an administrator determines which types of gestures should be stored in the gesture library as known or approved gestures. For example, an administrator may determine that dots, lines, and circles are three types of gestures that should be recognized for subsequent gesture visualization. Upon receiving input from the administrator, the gesture interpretation module 205 conducts statistical analysis on a series of sample videos featuring each of the three types of gestures. The sample videos may be stock videos or publicly available videos featuring gestures. Subsequently, the gesture interpretation module 205 averages the motions detected for dots, averages the motions detected for lines, and averages the motions detected for circles to determine standard base gestures for dots, lines, and circles, respectively. The standard base gesture(s) are then stored in a gesture library as a known or approved gesture.

The gesture interpretation module 205 then compares a recorded gesture to all the standard base gestures that are stored in the gesture library. In an example embodiment, if the recorded gesture falls within a certain standard deviation of the standard base gesture, then a match is determined. In an example embodiment, if the recorded gesture falls outside a certain standard deviation of the standard base gesture, then the system determines that no match is found.

In another embodiment, the gesture interpretation module 205 is a machine learning model that is trained to recognize different types of approved gestures from any gesture recordings. Similar to the neural network 300 of FIG. 3, an input layer, one or more hidden layers, and an output layer may be used in training a machine learning algorithm or model to classify the different types of gestures. For example, in a supervised learning approach, the training data comprises a known input, such as video data featuring different types of gestures that an administer has determined as approved gestures, and a known output, such as the properly classified or labeled gestures from the video data. The known input and known output are fed into the model and a weight matrix is applied. If the model's output does not match the known output (i.e.—the gesture is incorrectly classified), then the weight matrix is automatically adjusted, and the training data is run through the model iteratively until the model correctly outputs the known output. Overt time, the model may be trained to recognize any type of gesture, including new gestures that an administrator has determined should be an approved gesture.

The gesture interpretation module 205 may be trained by one or more training computers and, once trained, used in association with the server computing device 122 and/or client computing devices 102A, 102B, 102C to correctly identify different types of gestures from live data. For example, the gesture interpretation module 205 receives the recorded gesture from the gesture capture module 204 during a live conferencing session and runs the recorded gestures through the trained model to classify the gesture. The classified gesture is then compared to the list of approved gestures that is stored as a gesture library in the database 126. If the classified gesture matches a gesture on list of approved gestures, then the gesture interpretation module 205 initiates the drawing module 206 for further processing. If the classified gesture does not match a gesture on the list of approved gestures, then the gesture interpretation module 205 will not initiate the drawing module 206, in some embodiments.

In some embodiments, the gesture interpretation module 205 acts as a secondary check on gesture triggers that are detected by the gesture detection module 202 to ensure that no additional processing power is wasted on drawing and visualizing errant gestures. In other embodiments, the gesture interpretation module 205 is applied as a limitation such that only approved, known gestures that are stored in the gesture library are drawn and visualized. In other embodiments, this feature of the gesture interpretation module 205 is deactivated such that gesture visualization system 200 can capture any free-form gestures upon the detection of a gesture trigger by the gesture detection module 202.

3.3.2 Interpreting Gesture Location

The gesture interpretation module 205 is also configured to identify an intended location or placement of the gesture, in an example embodiment. For example, a large display screen often features areas of the screen that are physically out of reach of the presenter's hand or finger. Even if a portion of the display screen is within reach, a presenter may gesture in the general direction of the content being displayed rather than walking towards a different portion of the display screen where the content is being displayed. The gesture interpretation module 205 is configured to identify the intended location or placement of gesture drawing without the need for a presenter to physically reach the desired location.

In an embodiment, the gesture interpretation module 205 uses mathematical models to triangulate an intended location of a presenter's gesture. For example, the gesture interpretation module 205 may use one or more cameras, sensors, or a combination thereof to evaluate the angle at which a presenter's finger is pointing and calculate a three-dimensional coordinate of the intended location of the gesture. In another embodiment, the gesture interpretation module 205 is a machine learning model that is trained to identify an intended location or placement for the drawing of a gesture and subsequently work with the drawing module 206 to draw in the intended location. For example, an unsupervised machine learning model may be used to learn an intended location of a gesture drawing based on a grouping or clustering of data points to determine commonalities.

3.3.3 Interpreting Gesture Content

The gesture interpretation module 205 is also configured to identify an intended presentation content that a gesture pertains to. For instance, the gesture interpretation module 205 applies automatic speech recognition (ASR) to the audio data to identify spoken words during a timestamped conferencing session. The gesture interpretation module 205 also applies optical character recognition (OCR) to the video data to identify alphanumeric elements such as letters and numbers that are projected or displayed during the same timestamped conferencing session. In some embodiments, the gesture interpretation module 205 uses image recognition to identify images projected or displayed during the conferencing session.

The gesture interpretation module 205 receives timestamp information related to each gesture featured during a particular video conferencing session from the gesture capture module 204. The gesture interpretation module 205 then cross-references the timestamp of the spoken words and the timestamp of the alphanumeric elements and/or images displayed with the timestamp of each gesture received from the gesture capture module. This enables the gesture interpretation module 205 to identify certain presentation content as the intended content that the presentation gestures towards. Once an intended content is identified, the gesture interpretation module 205 works in conjunction with the drawing module 206 to generate a digital drawing of the gesture(s) in relation to the intended content. In some embodiments, a machine learning model is trained to identify content that the drawing pertains to, in accordance with machine learning techniques previously discussed herein.

3.3.4 Interpreting Gesture Originator

More than one presenter and/or more than one audience member often make gestures towards a presentation. In an embodiment, the gesture interpretation module 205 works in conjunction with the gesture capture module 204 timestamp feature to identify the originator of each gesture. For example, upon the capture of a timestamped gesture by the gesture capture module 204, the gesture interpretation module 205 accesses information from the streaming session to assign an identification to the originator the gestures. In an embodiment, the streaming session information includes, for example, the identified names of various participants in a video conferencing session, audio-visual data on participants who spoke while gesturing, and so forth.

In some embodiments, the gesture interpretation module 205 uses an identified speaker's name from the conferencing session as an originator ID and stores the originator ID in association with the timestamped gesture captured by the gesture capture module 204 in database 126. In other embodiments, the gesture interpretation module 205 uses facial recognition to identify an originator, automatically assign an originator ID, such as Originator1, and store the originator ID in database 126. Any naming convention for the originator ID may be used. Moreover, any number of originator IDs may be assigned to any number of gesture originators. The gesture interpretation module 205 is also configured to identify when a gesture originator has already been assigned an originator ID and apply the same originator ID to each gestures made by that originator. For example, if the John Smith has already been assigned an originator ID for the current video session, then the gesture interpretation module 205 will continue to use that originator ID for all of John Smith's gestures. The gesture interpretation module 205 subsequently works in conjunction with the drawing module 206 to generate color-coded gesture drawings specific to each originator ID, as further described herein.

3.4 Drawing Module

Subsequently, the drawing module 206 of FIG. 2A and FIG. 2B accesses the recorded video that is stored in database 126 and generates a digital drawing of a gesture and stores the digital drawing as a gesture layer in the database 126. In some embodiments, the drawing module 206 is configured with a default line thickness. In other embodiments, the drawing module 206 estimates a line thickness based on the source of the gesture. For example, if a laser pointer is used, then a thinner line thickness will be used for the drawing, whereas if a hand is used, then a thicker line thickness will be used for the drawing. In an embodiment, the drawing module 206 is configured to create a drawing that follows the gesture. For example, if a presenter draws a circle using his or her finger, then the drawing module 206 will follow the gesture created by the finger and draw a circle. The drawing module 206 then saves the drawing as a gesture layer in database 126 for further processing by the stitching module 208, as further described herein.

In some embodiments, a coordinate grid is used to generate a free-form digital drawing of the gesture. For example, the drawing module 206 applies a coordinate grid to the video recording on a frame-by-frame basis. The coordinate grid may be any grid, such as a five by ten grid, eight by 15 grid, 20 by 30 grid, 100 by 200 grid, or any other sized grid with any number of intersecting coordinates. In an embodiment, the coordinates may be written as a set of (X, Y) coordinates, where X represents the X-axis and Y represents the Y-axis. The drawing module 206 works in conjunction with the gesture detection module 202, gesture capture module 204, and/or gesture interpretation module 205 to follow the gesture frame-by-frame, from one timestamp to the next, and track the associated coordinates until the gesture completion is detected, in some embodiments.

Each frame's coordinates are then combined to create a single digital drawing of the gesture. In some embodiments, a mark, such as a dot, is used to indicate the coordinate position or placement of the gesture from one frame to the next. The drawing module 206 then connects the marks frame-by-frame to create the digital drawing of the gesture. In an example embodiment, a first frame of a video stream features a gesture at coordinate (0, 0), a second frame features a gesture at (1, 1), and a third frame features a gesture at (2, 2). The drawing module 206 will mark each coordinate with a dot and connect the dots from each frame to create a drawing of a line from coordinate (0, 0) to coordinate (2, 2).

In some embodiments, the drawing module 206 uses the coordinate grid to generate a drawing in a location or in reference to particular presentation content determined by the gesture interpretation module 205, as previously discussed herein. For example, if the gesture interpretation module 205 triangulates an intended location of a presenter's hand gesture as in the top right-hand corner of the presentation screen, the drawing module 206 will apply the coordinate grid to a set of video frames and generate the digital drawing of the gesture, on a frame-by-frame basis, in the intended location identified by the gesture interpretation module 205.

In another embodiment, the drawing module 206 works in conjunction with the gesture interpretation module 205 to draw or stamp approved, known gesture shapes that are stored in the database 126. For example, where a gesture interpretation module 205 is used, once the gesture interpretation module 205 identifies an approved gesture, the gesture interpretation module 205 signals the drawing module 206 to access a drawing library with pre-fabricated gesture shapes stored in database 126. In an embodiment, a particular pre-fabricated gesture shape corresponds to each of the approved gestures identified by the gesture interpretation module 205. The drawing library includes standard shapes for a dot, a line, a circle, a cylinder, a triangle, a square, a rectangle, an arrow, or any approved gesture shapes, in an example embodiment. The drawing module 206 is configured to estimate a size for the pre-fabricated gesture shapes based on the presenter's gesture, estimate a placement or location and/or referenced content as previously discussed herein, and then stamp the pre-fabricated gesture shape at the determined location and/or in association with the referenced content.

In an embodiment, the drawing module 206 is configured to retrieve gesture originator ID information from the database 126 and automatically color-code the drawings based on the originator ID. For example, the drawing module 206 will color-code all gesture drawings from a first presenter with an originator ID of "Originator1" in a red color, all gesture drawings from a second presenter with an originator ID of "Originator2" in a blue color, and all gesture drawings from an audience member with an originator ID of "Originator3" in a yellow color. Any number of colors may be used in association with any number of gesture originators. The automated color assignments may be stored in association with the timestamped, originator-labeled gestures in database 126 for reuse during the same conferencing session. In some embodiments, the same color assignments may be used to differentiate originators in a different conferencing session.

Subsequently the digital drawing of the gesture is stored in database 126 as a gesture layer for further processing by the stitching module 208, as further described herein.

3.5 Stitching Module

The stitching module 208 of FIG. 2A and FIG. 2B accesses the original video stored in the database 126 and the gesture layer stored in the database 126 in order to stitch the video and the gesture layer together to generate a gesture visualization and store the gesture visualization in the database 126. In some embodiments, the gesture layer is placed over the original video and combined such that the drawing of the gesture overlays the original video of the gesture frame by frame. The combined end product is a gesture visualization that is stored in the database 126 for subsequent display by the display module 210, as further described herein.

In some embodiments, where a presenter is presenting content from an original digital presentation that is stored in a .ppt format, .pdf format, or any other format, the stitching module 208 is configured to memorialize the presentation gestures from the video conferencing session in association with the original presentation slide deck or document. For example, the stitching module 208 works in conjunction with the gesture interpretation module 205 to determine which content or slides each gesture applies to, as previously discussed herein. The stitching module 208 also access the original digital presentation file that is stored in database 126, applies the gesture visualization to the original digital presentation file, and then stores the modified digital presentation file in database 126.

For instance, when a conferencing session involves a shared screen featuring an original digital presentation, the stitching module 208 is configured to access the original digital presentation file that is stored in database 126 and perform OCR and/or image recognition on the original digital presentation file to generate a processed digital presentation file. The stitching module 208 is also configured to perform OCR and/or image recognition on one or more frames of the gesture visualization to generate a processed gesture visualization frame. For example, the final frame of a gesture visualization features the entirety of a gesture drawing. The stitching module 208 may identify this last frame and perform an OCR and/or image recognition on the last frame.

Subsequently, the stitching module 208 cross-references the processed digital presentation file with the processed gesture visualization frame to match the content of the processed digital presentation file with the contents of the gesture visualization frame. Once matched, the stitching module 208 combines the processed gesture visualization frame with the matched slide or page of the processed digital presentation file to generate a modified digital presentation file. Subsequently the modified digital presentation file is stored in database 126.

In some embodiments, the stitching module 208 automatically applies this memorialization feature. In other embodiments, memorialization is an optional feature that may be selected or deselected.

3.6 Display Module

The display module 210 of FIG. 2A and FIG. 2B causes the gesture visualization, which was generated by the stitching module 208, to be displayed in one or more displays. In some embodiments, the gesture visualization is displayed in a display associated with a presenter's computing device. For example, if the presenter is sharing his or her screen and making gestures towards the screen, then the gesture visualization will be displayed in the display screen associated with a presenter's computing device. In other embodiments, the gesture visualization is displayed in a display associated with other computing devices besides the presenter's computing device. In the example above, if the presenter is sharing his or her screen and making gestures towards the screen, then the gesture visualization will be displayed in a display screen associated with one or more other video conferencing participants' computing devices. In some embodiments, the display module 210 causes the gesture visualization to be displayed in both the presenter's computing device and one or more other computing devices.

In an embodiment, the gesture visualization output can be sent as an emulated video device, which would allow for a provider-agnostic gesture visualization feature. In this embodiment, any video conferencing application, regardless of provider, would believe the media data is originating from a camera associated with the client computing device, which allows for subsequent distribution and/or display.

3.6 Example Embodiments

Figure 4A:
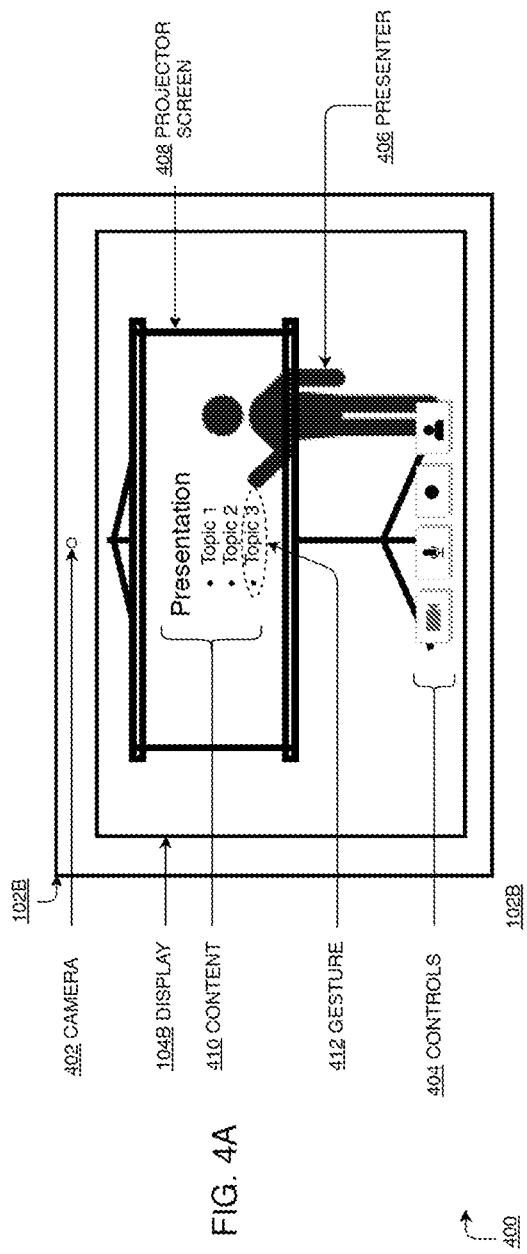

FIG. 4A and FIG. 4B illustrate gesture capturing 400, in an example embodiment. In the examples of FIG. 4A and FIG. 4B, a client computing device 102B features a display 104B that is used to display a variety of content. In this embodiment, the client computing device 102B is engaged in a video conferencing session where various controls 404 for the video conferencing session is displayed. In some embodiments, the controls 404 are not displayed. In some embodiments, the client computing device 102B has a front facing camera 402 while in other embodiments, the client computing device 102B is associated with a rear facing camera. In some embodiments, the rear facing camera is activated to capture a video of a presenter 406 when the client computing device 102B is associated with the presenter. In other embodiments, the rear facing camera is not activated at all when the client computing device 102B is associated a participant of the video conferencing session rather than the presenter.

In the example embodiment of FIG. 4A, the video conferencing session features a presenter 406 standing in front of a projector screen 408 to discuss the content 410 that is projected onto the projector screen 408. The example content 410 of FIG. 4A and FIG. 4B features a title of "Presentation" and three pullet points for "Topic 1," "Topic 2," and "Topic 3." When a presenter 406 initiates a gesture 412, such as pointing towards the projector screen 408, the gesture 412 is detected by the gesture detection module 202, as previously described, and the gesture 412 is captured by the gesture capture module 204. In the example of FIG. 4A, the dotted oval represents the movement of the gesture 412. Subsequently, in the example of FIG. 4B, the presenter 406 has shifted positions, and a gesture visualization 414 has been generated and displayed through the use of the drawing module 206, the stitching module 208, and the display module 210, as previously discussed herein.

Figure 5A:
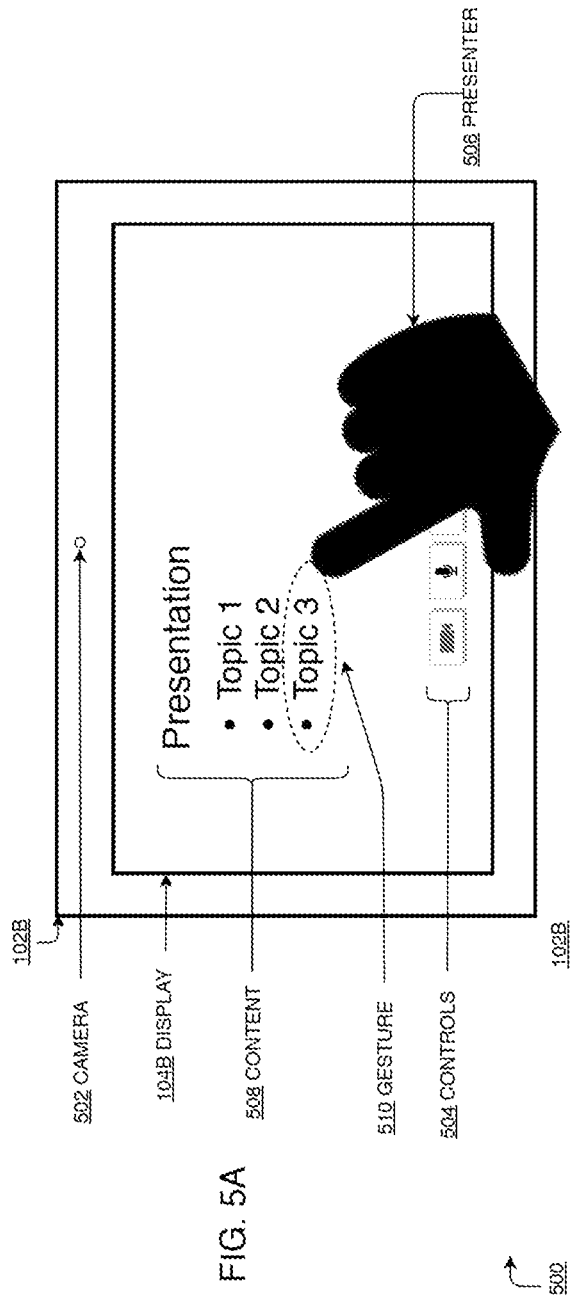

FIG. 5A and FIG. 5B also illustrate gesture capturing 500, in another example embodiment. In the examples of FIG. 5A and FIG. 5B, a client computing device 102B features a display 104A that is used to display a variety of content. In the example of FIG. 5A, the display 104B is the display of a computing device 102B associated with a presenter 506. In the example of FIG. 5B, the display 104B may be the display of a computing device 102B that is associated with a presenter 506 or a computing device 102B that is not associated with the presenter but rather is associated with another participant in a video conferencing session.

In the embodiment of FIG. 5A and FIG. 5B, the client computing device 102B is engaged in a video conferencing session where various controls 504 for the video conferencing session is displayed. In some embodiments, the controls 504 for the video conferencing session is displayed. In some embodiments, the controls 504 are not displayed. In some embodiments, the client computing device 102B has a front facing camera 502 while in other embodiments, the client computing device 102B is associated with a rear facing camera. In the embodiment of FIG. 5A, the front facing camera 502 is directed towards a presenter 506 for capturing the movements of the presenter 506. In the embodiment of FIG. 5B, the front facing camera 502 may be directed towards the presenter 506 if the computing device 102B is associated with the presenter. In another embodiment of FIG. 5B, the front facing camera 502 may be directed towards a participant of the video conferencing if the computing device 102B is associated with a participant. In another embodiment of FIG. 5B, the front facing camera 502 is not activated at all.

In the embodiment of FIG. 5A, the video conferencing session features a presenter 506 that has initiated a screen sharing feature to discuss the content 508 of a presentation that is being shared to other participants. The example content 508 of FIG. 5A and FIG. 5B features a title of "Presentation" and three bullet points for "Topic 1," "Topic 2," and "Topic 3." When the presenter 506 initiates a gesture 510, such as pointing towards the presenter's own display 104B, the gesture 510 is detected by the gesture detection module 202, as previously described, and the gesture 510 is captured by the gesture capture module 204. In the example of FIG. 5A, the dotted oval represents the movement of the gesture 510. Subsequently, in the example of FIG. 5B, the presenter 506 has removed his or her finger and is no longer gesturing at the display 104B. The gesture visualization 512 has been generated and display through the use of drawing module 206, the stitching module 208, and the display module 210, as previously discussed herein.

In another example embodiment, the features described herein are used to recognize gestures originating from audience members in addition to presenters. For example, during a video conferencing session featuring a shared screen, a camera from one client computing device 102B captures a gesture from an audience member who is circling a portion of the shared screen while a camera from a different client computing device 102BA captures movement from the presenter who has shared the screen. The gesture visualization system 200 is configured to capture the gestures originating from the audience member, generate a gesture visualization as previous discussed herein, and redistribute the gesture visualization to the displays of the audience member and all other participants in the conferencing session.

The features described herein are used to recognize specific audience-related gestures. For example, a camera directed at an audience may capture an audience member raising his or her hand. The audience member(s) may be in the same room, participating in the conferencing session remotely, or any combination thereof. In an embodiment, the gesture visualization system 200 receives this recorded hand raise gesture and compares the gesture with the known or approved gestures stored in the gesture library. If the gesture is identified as and/or matches a hand raise gesture, then the gesture visualization system 200 may be configured to generate a notification to the presenter that an audience member has a question. The notification may be a visual notification, such as a textual notification or flashing name presented in one or more displays, or an auditory notification, such as a ring or jingle. In some embodiments, both visual and auditory notifications may be used.

In some embodiments, recognizing specific audience-related gestures includes recognizing and polling one or more responses from audiences. For example, one or more cameras directed at one or more audience members may capture head nods of affirmation or head shakes of negation in response to a presenter's question. The audience member(s) may be in the same room, participating in the conferencing session remotely, or any combination thereof. The gesture visualization system 200 receives these recorded head nods and head shakes as gestures and compares the gestures with known gestures stored in the gesture library. If the gesture is identified as a head nod, then a polling function associated with the gesture visualization system 200 may increase an incremental count of polled "Yes" responses from the audience. If a gesture is identified as a head shake, then the polling function may increase an incremental count of polled "No" response from the audience.

4.0 Procedural Overview

Figure 6:
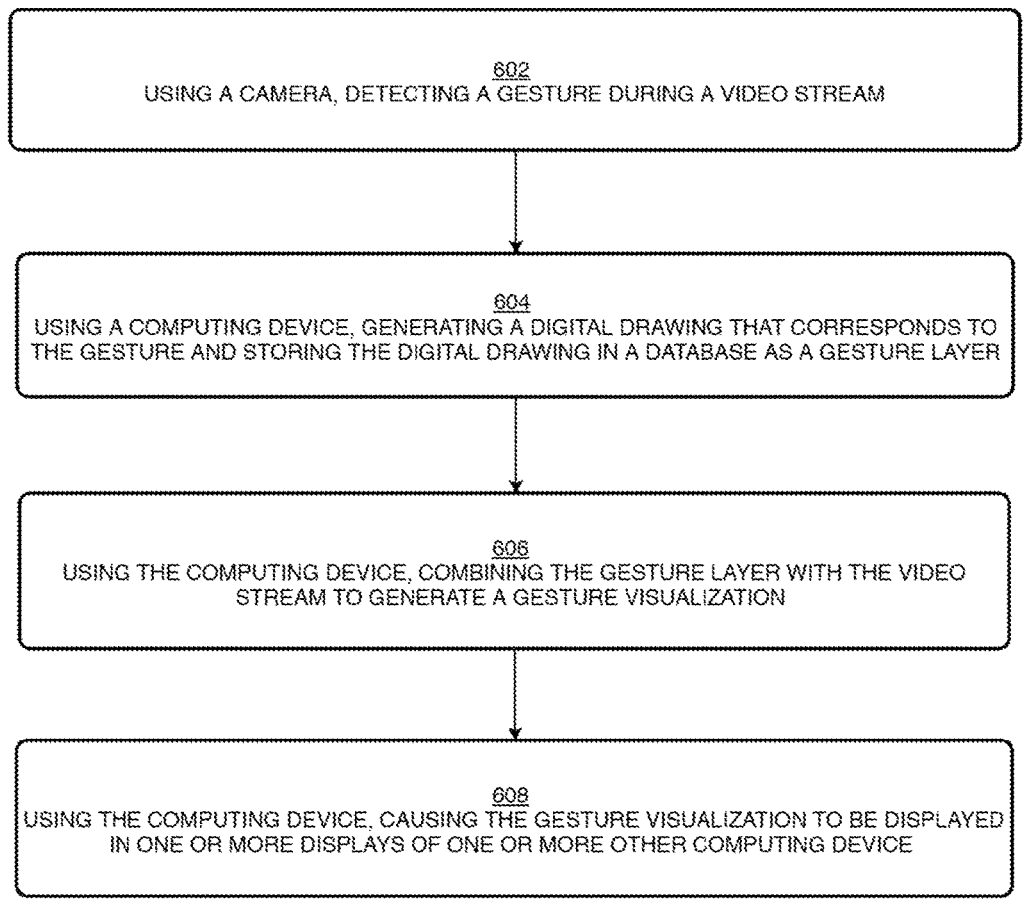
FIG. 6 is a flow chart that shows a method for improving digital capture of physical gestures, in an example embodiment.

FIG. 6 illustrates a computer-implemented method 600 for improving digital capturing of physical gestures, in an example embodiment. The flow diagram of FIG. 6 shows a method 600 or plan that may be used as a basis for programming one or more of the functional modules using a programming development environment or programming language that is deemed suitable for the task. Thus, FIG. 6 is intended as an illustration as the functional level at which skilled persons, in the art to which this disclosure pertains, communicate with one another to describe and implement algorithms using programming. This diagram is not intended to illustrate every instruction, method object or sub-step that would be needed to program every aspect of a working program, but are provided at the high, functional level of illustration that is normally used at the high level of skill in this art to communicate the basis of developing working programs.

At step 602, a gesture is detected during a video stream using a camera. The camera is any camera configured to capture and send media data, such as video streaming data. The gesture is any movement made by a human or non-human component, as previous discussed herein. In some embodiments, a presenter uses a screen sharing feature through a video conferencing application and gestures towards the display 104B of a computing device, as discussed with regards to FIG. 5A and FIG. 5B. The video stream featuring the gesture is captured by a camera 502 associated with a computing device. In an embodiment, the gesture detection module 202 uses a trained machine learning model to detect gesture triggers. Subsequently, the gesture capture module 204 activates a recording function associated with the client-side application 102A, 102B, 102C to record the live streaming video and store it in a database.

At step 604, using a computing device, a digital drawing that corresponds to the gesture is generated and stored in a database as a gesture layer. In an embodiment, the digital drawing comprises generating grids for each frame of a video stream that features the gestures. For example, if a presenter uses a finger to underline a word, then each frame that features the gesture of the finger's underlining will have an associated coordinate grid created by the drawing module 206. Subsequently, the drawing module 206 will digitally mark the coordinates of the gesture from each frame and connect the marks from frame to frame to generate the digital drawing. The digital drawing is then stored as a gesture layer that is combined or layered on top of the original video stream.

At step 606, using the computing device, the gesture layer and the video stream are combined to generate a gesture visualization. In an embodiment, the stitching module 208 combines the gesture layer with the original video of the video stream on a frame-by-frame basis. For example, the first gesture layer corresponding to a first video frame will be layered on top of the first video frame. The second gesture layer corresponding to a second video frame will be layered on top of the second video frame, and so forth.

At step 608, the computing device causes the gesture visualization to be displayed in one or more displays of one or more other computing devices. For example, the server computing device 122 may use the display module 210 to distribute the gesture visualization to all participants in a video conferencing session. In the example of FIG. 4A and FIG. 4B, the client computing device 102B may belong to another participant of a video conferencing session. The server computing device 122 sends the gesture visualization to the client computing device 102B through the application 106B and causes the gesture visualization to be displayed in the display 104B associated with the client computing device 102B. In some embodiments, the computing device causes the gesture visualization to be displayed in a display associated with the computing device. For example, the server computing device 122 may use the display module 210 to distribute the gesture visualization to the presenter of the video conferencing session. In the example of FIG. 4A and FIG. 4B, the client computing device 102B may belong to the presenter who is using the video conferencing application to record a practice presentation session. The server computing device 122 sends the gesture visualization to the client computing device 102B through the application 106B and causes the gesture visualization to be displayed in the display 104B associated with the client computing device 102B. In some embodiments, the computing device causes the gesture visualization to be displayed in a display associated with the computing device, as well as in one or more displays of one or more other computing devices, as previously discussed herein.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A computer-implemented method for improving digital capturing of gestures, the method comprising:
   using a camera capturing one or more images of a user;
   detecting a gesture from the one or more images of the user, wherein the gesture is being made during a video stream, wherein the gesture and the one or more images of the user are absent from the video stream;
   using a computing device, generating a digital drawing that corresponds to the gesture and storing the digital drawing in a database as a gesture layer;
   using the computing device, combining the gesture layer with the video stream to generate a gesture visualization;
   using the computing device, causing the gesture visualization to be displayed in one or more displays of one or more other computing devices;
   generating a first grid for a first frame of the video stream featuring the gesture;
   generating a first mark on the first grid, wherein the first mark represents a first placement of the gesture for the first frame;
   generating a second grid for a second frame of the video stream featuring the gesture;
   generating a second mark on the second grid, wherein the second mark represents a second placement of the gesture for the second frame; and
   wherein generating the digital drawing comprises connecting the first mark to the second mark.

2. The method of claim 1, wherein detecting the gesture comprises detecting a gesture trigger using a trained machine learning model.

3. The method of claim 1, further comprising:
   detecting a gesture completion using a trained machine learning model.

4. The method of claim 1, wherein generating the digital drawing is responsive to detecting a gesture completion.

5. The method of claim 1, further comprising:
   using the computing device, causing the gesture visualization to be displayed in a display associated with the computing device.

6. The method of claim 1, wherein the gesture comprises movement from a human or an instrument.

7. A non-transitory computer-readable medium storing a set of instructions that, when executed by a processor, cause:
   using a camera capturing one or more images of a user;
   detecting a gesture from the one or more images of the user, wherein the gesture is being made during a video stream, wherein the gesture and the one or more images of the user are absent from the video stream;
   using a computing device, generating a digital drawing that corresponds to the gesture and storing the digital drawing in a database as a gesture layer;
   using the computing device, combining the gesture layer with the video stream to generate a gesture visualization;
   using the computing device, causing the gesture visualization to be displayed in one or more displays of one or more other computing devices;
   generating a first grid for a first frame of the video stream featuring the gesture;
   generating a first mark on the first grid, wherein the first mark represents a first placement of the gesture for the first frame;
   generating a second grid for a second frame of the video stream featuring the gesture;
   generating a second mark on the second grid, wherein the second mark represents a second placement of the gesture for the second frame; and
   wherein generating the digital drawing comprises connecting the first mark to the second mark.

8. The non-transitory computer-readable medium of claim 7, wherein detecting the gesture comprises detecting a gesture trigger using a trained machine learning model.

9. The non-transitory computer-readable medium of claim 7, further comprising an additional set of instructions that, when executed by a processor, cause:
   detecting a gesture completion using a trained machine learning model.

10. The non-transitory computer-readable medium of claim 7, wherein generating the digital drawing is responsive to detecting a gesture completion.

11. The non-transitory computer-readable medium of claim 7, further comprising an additional set of instructions that, when executed by a processor, cause:
   using the computing device, causing the gesture visualization to be displayed in a display associated with the computing device.

12. The non-transitory computer-readable medium of claim 7, wherein the gesture comprises movement from a human or an instrument.

13. A system for improving digital capturing of gestures, the system comprising:
   a processor;
   a memory operatively connected to the processor and storing instructions that, when executed by the processor, cause:
   using a camera capturing one or more images of a user;
   detecting a gesture from the one or more images of the user, wherein the gesture is being made during a video stream, wherein the gesture and the one or more images of the user are absent from the video stream;
   using a computing device, generating a digital drawing that corresponds to the gesture and storing the digital drawing in a database as a gesture layer;
   using the computing device, combining the gesture layer with the video stream to generate a gesture visualization;
   using the computing device, causing the gesture visualization to be displayed in one or more displays of one or more other computing devices;
   generating a first grid for a first frame of the video stream featuring the gesture;
   generating a first mark on the first grid, wherein the first mark represents a first placement of the gesture for the first frame;

generating a second grid for a second frame of the video stream featuring the gesture;

generating a second mark on the second grid, wherein the second mark represents a second placement of the gesture for the second frame; and wherein generating the digital drawing comprises connecting the first mark to the second mark.

14. The system of claim 13, wherein detecting the gesture comprises detecting a gesture trigger using a trained machine learning model.

15. The system of claim 13, wherein the memory stores additional instructions that, when executed by the processor, further cause:

detecting a gesture completion using a trained machine learning model.

16. The system of claim 13, wherein generating the digital drawing is responsive to detecting a gesture completion.

17. The system of claim 13, wherein the memory stores additional instructions that, when executed by the processor, further cause:

using the computing device, causing the gesture visualization to be displayed in a display associated with the computing device.

\* \* \* \* \*